Patented Jan. 16, 1934

1,943,570

UNITED STATES PATENT OFFICE 1,943,570

ACCELERATOR FOR THE VULCANIZATION OF RUBBER

Carl S. Williams, Woodbury, N. J., assignor to E. I. du Pont de Nemours & Company, Inc., Wilmington, Del., a corporation of Delaware No Drawing. Application March 25, 1932
Serial No. 601,298

22 Claims. (Cl. 18—53)

This invention relates to improvements in the resin type of rubber vulcanization accelerators and specifically relates to the preparation and use of substantially anhydrous resin accelerators.

There are a great number of the so-called resin type of vulcanization accelerators which are prepared by the condensation of chemical bodies in such a manner that water is formed during the reaction, or the reaction is carried on under conditions which are not anhydrous, and even may be carried on in aqueous solution. When such accelerators have been formed the practice has been to decant off large amounts of water or to heat the bodies to a greater or less degree with or without vacuum in order to dispel as much of the residual water contained therein as possible. Often-times when possible the materials are further ground and spread out in trays for drying.

Such resin type of accelerators are formed for example by the condensation of an aromatic or aliphatic amine with an aromatic or aliphatic aldehyde. These have been prepared having great variation of ratios of aldehyde to amine, and under a great variety of conditions as to temperature and other details of operation as described for example in U.S.P. #1,201,850 or U.S.P. #1,796,240 and others. The products produced by these condensations vary from mobile liquids through less mobile and highly viscous materials to solid resinous types which can be ground. All of these resin types of accelerators, however, are characterized by the fact that the removal of the last 1 to 2% of water therefrom is only accomplished with difficulty.

This water removal becomes especially difficult with the viscous and the solid type of product even with those that can be ground. Some of the condensation products which have been thus produced are the reaction products of aniline and acetaldehyde, and other similar materials, such as, for example, those described in U.S.P. #1,201,850, and others ranging in aldehyde to amine ratios of 1 to 20 mols. of aldehyde to each mol. of amine.

I have found that such resinous products containing this residual water are in general unsuitable for use in preparing rubber insulation for wire, especially that which is to serve for insulated wire to carry high voltages, although they are satisfactory for use in other rubber goods. Thus when the solid aniline acetaldehyde composition formed from three mols. of aniline and two mols. of acetaldehyde with an acid catalyst and containing upwards of 1 to 2% residual water was used, it was difficult to obtain insulating having satisfactory dielectric properties.

This reaction product was of such melting point that it could be easily powdered, but even this, after heating during the formation period and again drying under vacuum in a ground condition, still contains from 1% to 2% of water. Approximately one-half of the water contained can be removed by heating this product at 100 to 110° C. under a vacuum of 29.5'' of mercury for 2 hours without injuring its properties. However, in order to remove the remainder of the water it is necessary to treat under severe conditions so that a portion of the constituents of the product are removed. This method of water removal is in general quite unsatisfactory because of the expense of operation and the time consumed in addition to possible injury to the accelerator.

The object of this invention is to provide a means for the chemical removal of the water from these resin types of accelerators in order to render them more suitable for use in rubber for insulation purposes; my invention also includes the new products thus prepared.

I have discovered that if a resin type accelerator containing such residual amounts of water as can not be readily removed by ordinary heating methods during preparation be treated with calcium oxide, this will react with the water to form calcium hydroxide and thus effectively dry the accelerator. The excess calcium oxide and the calcium hydroxide formed may be allowed to remain in the accelerator mixture since, when incorporated in the rubber, they merely act as a filler, considerable amounts of which are added to practically all rubber compounds. I have also discovered that other similarly acting materials i.e., those which will combine with water and which in themselves or the reaction product do not act injuriously on the rubber, may be used. Thus for example I have also utilized calcium carbide although the results secured are not as satisfactory as those secured with calcium oxide.

As illustrative of my invention, the effect of this treatment on the above described 3 to 2, acid catalyzed, aniline acetaldehyde reaction product will be given. This product was formed as described in U.S.P. 1,796,240 and after the final heating stage contained approximately 1% of moisture. This product was ground and then mixed with 10% of its weight of 100 mesh calcium oxide, after which the mixture was melted.

This produced an accelerating composition containing only 0.15 to 0.2% of water and its value as an accelerator was not diminished.

When using this accelerator prior to the calcium oxide treatment it was impossible to secure an insulated wire having a resistivity greater than 1500 megohms per mile, or a voltage at break-down greater than 10,000 volts. With the treated product, however, the resistivity of insulation produced using the accelerator on exactly comparable basis was 2,570 megohms per mile with a voltage at break-down of 16,500 volts.

I have tried this method of water removal on various resin accelerators which contained residual water in their commercial state and have found improvement in all cases.

I claim:

1. Method of removal of residual water from resinous bodies which comprises treating said bodies with a chemical material capable of reacting with the water therein.

2. Method of treating an aldehyde-amine resinous material which comprises treating said material with a chemical agent capable of reacting with residual water therein.

3. Method of decreasing the residual-free water content of a resinous material which comprises treating said material with calcium oxide.

4. Method of decreasing the residual-free water content of a resinous material which comprises treating said material with calcium carbide.

5. Method of removal of residual water from resin type of rubber vulcanization accelerators which comprises treating said accelerators with a chemical material capable of reacting with the water therein to produce a compound non-injurious to rubber.

6. Method of treating an aldehyde-amine resin type of vulcanization accelerator which comprises treating said accelerators with a chemical material capable of reacting with the water therein to produce a compound non-injurious to rubber.

7. In the production of aldehyde-amine resin type of vulcanization accelerator the step which comprises treating said material with a chemical capable of reacting with the water therein to produce a compound non-injurious to rubber.

8. A method of decreasing the water content of a resin type of rubber vulcanization accelerator which comprises treating said accelerator composition with calcium oxide.

9. Method of decreasing the water content of a resin type of rubber vulcanization accelerator which comprises treating said accelerator composition with calcium carbide.

10. Method of decreasing the water content of an aromatic amine-aliphatic-aldehyde type of accelerator, which comprises treating said accelerator composition with calcium oxide.

11. Method of decreasing the water content of a resinous aniline acetaldehyde type of accelerator which comprises treating said accelerator composition with calcium oxide.

12. Method of decreasing the water content of a resinous accelerator, which during its formation causes the release of moisture within the resin body which comprises treating said accelerator composition with calcium oxide.

13. As a new product a resin type of vulcanization accelerator containing calcium hydroxide and less than 1% by weight of water.

14. As a new product a resinous aromatic amine-aliphatic-aldehyde type of vulcanization accelerator containing calcium hydroxide and about 0.2% by weight of water.

15. As a new product an aniline-acetaldehyde resin type of rubber vulcanization accelerator containing a small amount of calcium hydroxide and less than 1% by weight of water.

16. An ingredient in the process of vulcanizing comprising a resin type of vulcanization accelerator containing calcium hydroxide in an amount equivalent to not more than 10% by weight of calcium oxide and less than 1% by weight of water.

17. An ingredient in the process of vulcanizing comprising a resinous aromatic amine-aliphatic-aldehyde type of vulcanization accelerator containing a small amount of calcium hydroxide in an amount equivalent to not more than 10% by weight of calcium oxide, said accelerator containing less than 1% by weight of water.

18. An ingredient in the process of vulcanizing comprising a resinous aniline acetaldehyde type of rubber vulcanization accelerator containing calcium hydroxide and about 0.2% by weight of water.

19. A composition of matter comprising a resin type of vulcanization accelerator from which water has been removed by incorporating calcium oxide therein, said composition containing less than 1% by weight of water.

20. A composition of matter comprising a resin type of vulcanization accelerator from which water has been removed by incorporating calcium oxide therein, said composition containing about 0.2% by weight of water.

21. A composition of matter comprising a resinous aromatic amine-aliphatic aldehyde type of vulcanization accelerator from which water has been removed by incorporating calcium oxide therein, said composition containing less than 1% by weight of water.

22. A composition of matter comprising a resinous aromatic amine-aliphatic aldehyde type of vulcanization accelerator from which water has been removed by incorporating calcium oxide therein, said composition containing about 0.2% by weight of water.

CARL S. WILLIAMS.